Patented May 29, 1923.

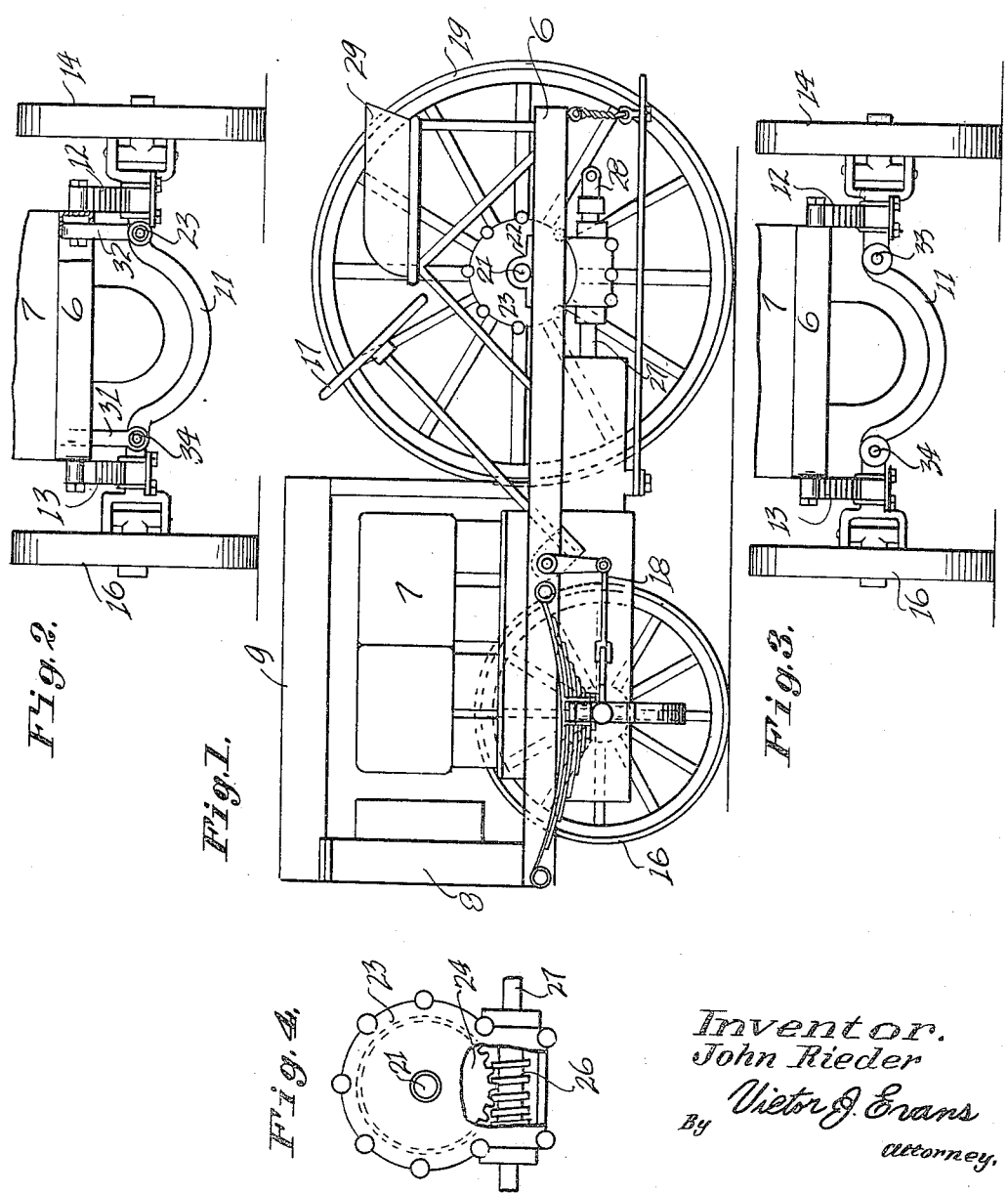

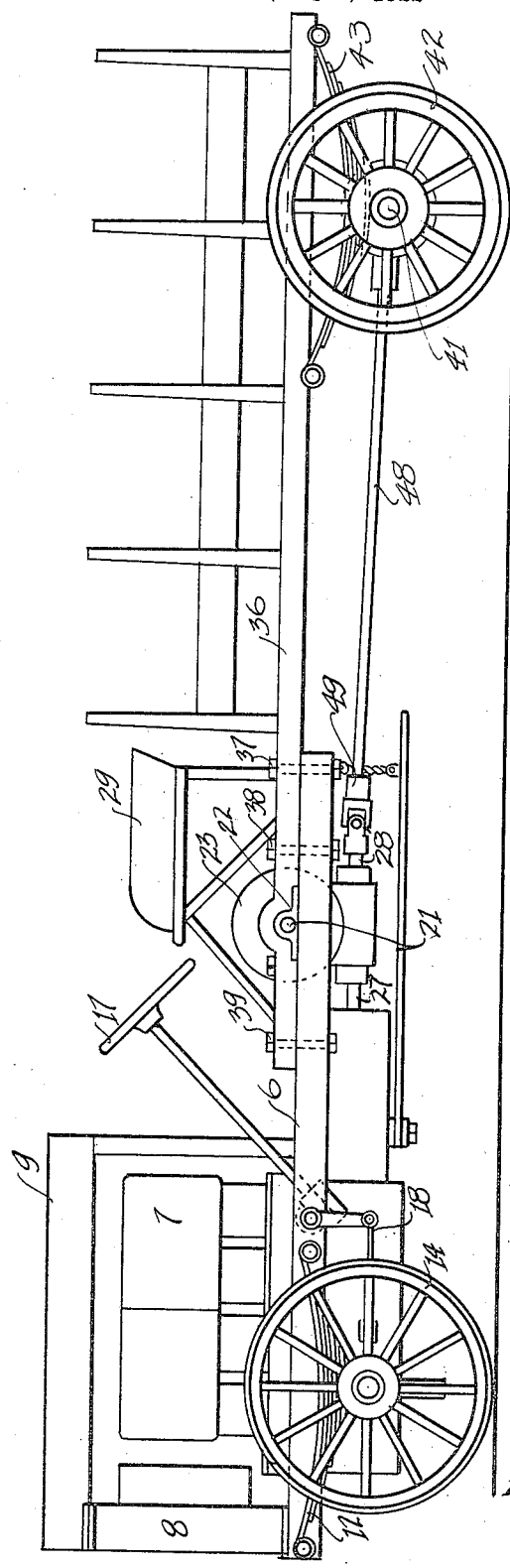

1,457,270

UNITED STATES PATENT OFFICE.

JOHN RIEDER, OF BURLINGAME, CALIFORNIA.

COMBINED TRUCK AND TRACTOR.

Application filed April 7, 1922. Serial No. 550,409.

*To all whom it may concern:*

Be it known that I, JOHN RIEDER, a citizen of Switzerland, residing at Burlingame, in the county of San Mateo and State of California, have invented new and useful Improvements in Combined Trucks and Tractors, of which the following is a specification.

This invention relates to improvements in combined trucks and tractors.

The principal object of this invention is to produce a combined vehicle which may be either employed as a tractor for the purpose of pulling implements over rough ground or as a vehicle having a resilient support and capable of being driven over highways.

Another object is to devise means whereby a body portion can be secured to the truck portion thereby lengthening the wheelbase and thus producing a road vehicle.

Another object is to provide means whereby the springs are thrown out of action when the truck is employed as a tractor.

Another object is to provide means whereby the power may be conveniently applied to the rear wheels of the tractor or truck as desired.

Other objects and advantages will be apparent during the course of the following description.

In the accompanying drawings forming a part of this specification, and in which like numerals are employed to designate like parts throughout the same, Fig. 1 is a side elevation of my tractor, Fig. 2 is a front elevation thereof, Fig. 3 is a front elevation similar to Figure 2, but showing the springs in operative position, Fig. 4 is a detail view of the driving gear for the tractor, Fig. 5 is a side elevation of my tractor converted into a truck, and Fig. 6 illustrates the differential of the truck.

In the accompanying drawings wherein for the purpose of illustration is shown a preferred embodiment of my invention, the numeral 6 designates the frame of the truck, the numeral 7 an engine mounted thereon, this engine may be of any well-known type such as the internal combustion engine. The numeral 8 designates the usual radiator and 9 a fuel tank. A front axle 11 is secured beneath the frame 6 as shown in Figure 2 and has secured thereto springs 12 and 13. The usual steering wheels 14 and 16 are mounted upon the axle 11. Steering of these wheels is accomplished through the medium of the usual steering wheel 17 and the steering rod 18. At 19 I have shown a rear wheel of large diameter such as is commonly used in propelling a vehicle over a rough surface. These rear wheels are mounted on a shaft journaled in journal boxes 22 mounted upon a frame 6. A gear case 23 is mounted on the shaft 21 and is adapted to house a gear 24 which gear in turn meshes with a worm 26 secured on the engine shaft 27. This engine shaft terminates in a portion 28 the function of which will be later described. A seat 29 is provided for the driver and is of the usual construction.

At 31 and 32 (see Fig. 2) I have shown links secured to the frame 6 and adapted to connect as at 33 and 34 to the axle 11. Through this connection I eliminate the action of the springs 12 and 13 while the device is being used as a truck. The links 31 and 32 are swung up against the frame when not in use and are out of view as shown in Figure 3.

By now referring to Figure 5 it will be noted that the driving wheels 19 shown in Figure 1 have been removed and that an additional frame 36 has been bolted as at 37, 38 and 39 to the frame 6. This additional frame carries a rear axle 41 upon which is mounted the usual rear wheels 42 supported as by springs 43 to the underside of the frame 36. A differential housing 44 is mounted upon the rear axle 41 as shown in Figure 6 within which is the usual master gear 46 and a spur gear 47. This spur gear is attached to a shaft 48 which extends forwardly and is connected through a universal joint to the end 28 of the engine shaft 27.

The operation of my device is as follows:—

Assuming that the parts are arranged as shown in Figure 1 the same will be functioning as a tractor at which time the links 21 and 22 will be secured to the front axle 11 thereby making a rigid structure of the same. When it is desired to convert the tractor into a road vehicle the front wheels are changed for those having rubber tires and the frame 36 is secured on the frame 6 after which the wheels 19 of the tractor are removed from the shaft 21 and the universal joint 49 is connected to the end 48 of the engine shaft 27. When this conversion is made the gear ratio is automatically changed from that of the worm drive for the tractor to that of the differential gear drive of the truck it being understood of course that the usual shift gears are employed for further variations in gear ratio.

It is to be understood that the form of my invention, herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, the combination of a tractor, having a frame, an axle mounted below said frame, springs secured to said frame and said axle, links pivoted to said frame, and adapted to have their opposite ends removably pivoted to said axle the pivotal connections of said links to said frame being on an angle of 90° with respect to the pivotal connection of said links to said axle for the purpose of causing said springs to be inoperative in all directions during the period of connection of said links to said axle.

In testimony whereof I, affix my signature.

JOHN RIEDER.